Feb. 2, 1954     A. J. WILLIAMS, JR     2,668,264
MEASURING SYSTEM OF THE BALANCEABLE NETWORK TYPE
Filed April 24, 1952     6 Sheets-Sheet 2

*INVENTOR.*
ALBERT J. WILLIAMS, JR.
BY
Woodcock and Phelan
ATTORNEYS

Feb. 2, 1954 A. J. WILLIAMS, JR 2,668,264
MEASURING SYSTEM OF THE BALANCEABLE NETWORK TYPE
Filed April 24, 1952 6 Sheets-Sheet 4

*INVENTOR.*
ALBERT J. WILLIAMS, JR.
BY
Woodcock and Phelan
ATTORNEYS

Feb. 2, 1954     A. J. WILLIAMS, JR     2,668,264
MEASURING SYSTEM OF THE BALANCEABLE NETWORK TYPE
Filed April 24, 1952     6 Sheets-Sheet 5

INVENTOR.
ALBERT J. WILLIAMS, JR.
BY
Woodcock and Phelan
ATTORNEYS

Feb. 2, 1954　　　A. J. WILLIAMS, JR　　　2,668,264
MEASURING SYSTEM OF THE BALANCEABLE NETWORK TYPE
Filed April 24, 1952　　　6 Sheets-Sheet 6

INVENTOR.
ALBERT J. WILLIAMS, JR.
BY
Woodcock and Phelan
ATTORNEYS

Patented Feb. 2, 1954

2,668,264

UNITED STATES PATENT OFFICE 2,668,264

MEASURING SYSTEM OF THE BALANCE-ABLE NETWORK TYPE

Albert J. Williams, Jr., Philadelphia, Pa., assignor to Leeds and Northrup Company, Philadelphia, Pa., a corporation of Pennsylvania Application April 24, 1952, Serial No. 284,006

12 Claims. (Cl. 318—28)

This invention relates to measuring systems of the type including electrically balanceable networks having at least one circuit element for unbalancing the network in response to change in the magnitude of a condition, and at least one adjustable circuit element for restoring balance of the network, and has for an object the provision of a method of and means for producing a response of the detector controlling the adjustment of the adjustable circuit element with error-voltages of a materially lower order than heretofore attained with the same amplification in the detector, with a materially decreased following-error, and without undesirable operating characteristics of the system.

While systems of the type shown in my Patents Nos. 2,367,746 and 2,522,976 have been commercially used with quite satisfactory results as compared to previous measuring systems, nevertheless opportunity remained for improved operation. In a system such as shown in Fig. 4 of my said Patent No. 2,522,976, there is achieved measurement of the ratio of two currents each ranging below about 20 microamperes. The detector of the measuring system of said Fig. 4 includes an amplifier which has high forward gain and as high as possible without introducing instability in the operation to provide maximum sensitivity in the operation of the system. In measuring the ratio of two currents where one of them, the standard current, is decreased to as much as one-fifth of its initial value, a sensitivity suitable for the initial value of current is not as high as it should be for a current one-fifth thereof. On the other hand, if the sensitivity or gain of the amplifier be increased correspondingly to that needed for the small current, then upon flow of a large current, undesirable operating characteristics result, such as the "hunting," or the operating of the driving means first beyond and then short of a balance point.

In carrying out the invention in one form thereof there is achieved an increase of five-fold in the sensitivity without introduction of hunting and without change in gain of the amplifier from the value established for the higher initial current. More particularly, the increase in sensitivity and the avoidance of hunting are achieved by connecting across the detector an error-current integrator which, when the error-voltage is small, applies an increasing potential difference to the detector and thus effectively increases its sensitivity and decreases the following-error.

The present invention is particularly applicable to measuring systems of the type in which the detector and amplifier control the energization of a motor which adjusts a circuit element, such as a slidewire, to maintain the balancing system approximately in balance with change in the magnitude of a condition. When the network is unbalanced, for example as by a high rate of change in the condition under measurement or by an abrupt change of large magnitude, the motor, when of the alternating-current type, will quickly be brought to its maximum speed, approaching its synchronous speed which, of course, cannot be increased.

In accordance with the present invention, when the motor is operating at high speed which may be substantially below its synchronous or speed-limited operation, the integrated potential difference is removed from the detector as by disconnection of the error-current integrator from the detector. When the motor speed decreases to a still lower value, the error-current integrator is again made effective to apply to the detector the integrated potential difference of the error-current to increase the effective sensitivity thereof.

In its simplest form, the current integrator may comprise a capacitor, preferably connected in series-circuit relation with a resistor across the input circuit of the detector-amplifier with suitable switching means for effectively removing the capacitor from the circuit when the speed of the motor is above a predetermined value and to bring it into operation in the input circuit when the speed of the motor drops below a predetermined value.

The present invention may be applied to balanceable networks of widely varying type, several of which are in themselves new in aspects which reduce following-error in different ways and forming part of the present invention. For a more detailed description of the various networks and for further objects and advantages of the invention, reference is to be had to the following detailed description taken in conjunction with the accompanying drawings, in which.

Figure 5:
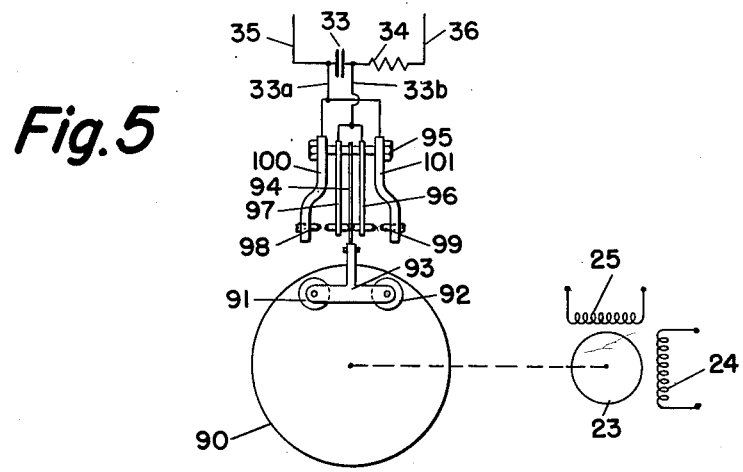

Fig. 5 diagrammatically illustrates one form of a speed-responsive switch;

Fig. 5-A is a part of a record chart; and

Figure 2:
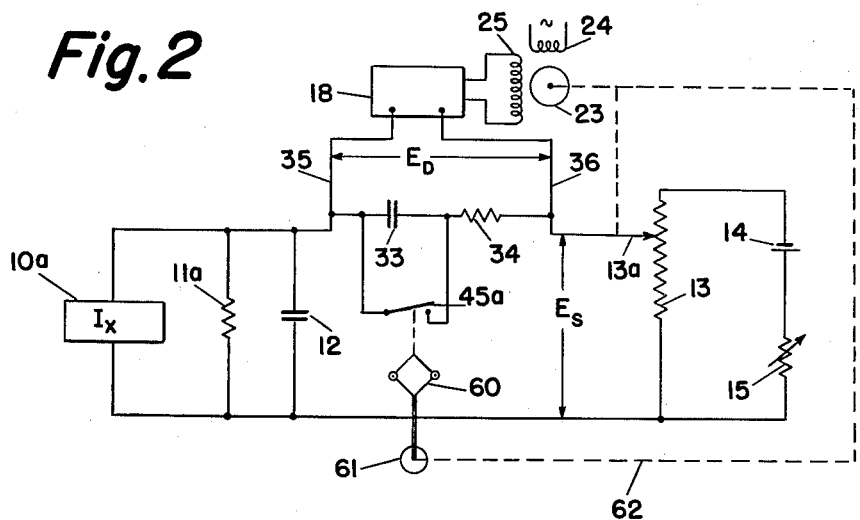
Fig. 2 is a simplified wiring diagram illustrating the invention applied to a current-measuring system.

Figs. 6-11 are wiring diagrams of further modifications of the invention, some of them including tachometers and speed-responsive switches useful in other illustrated modifications of the invention in place of the switch of Fig. 2.

Figure 1:
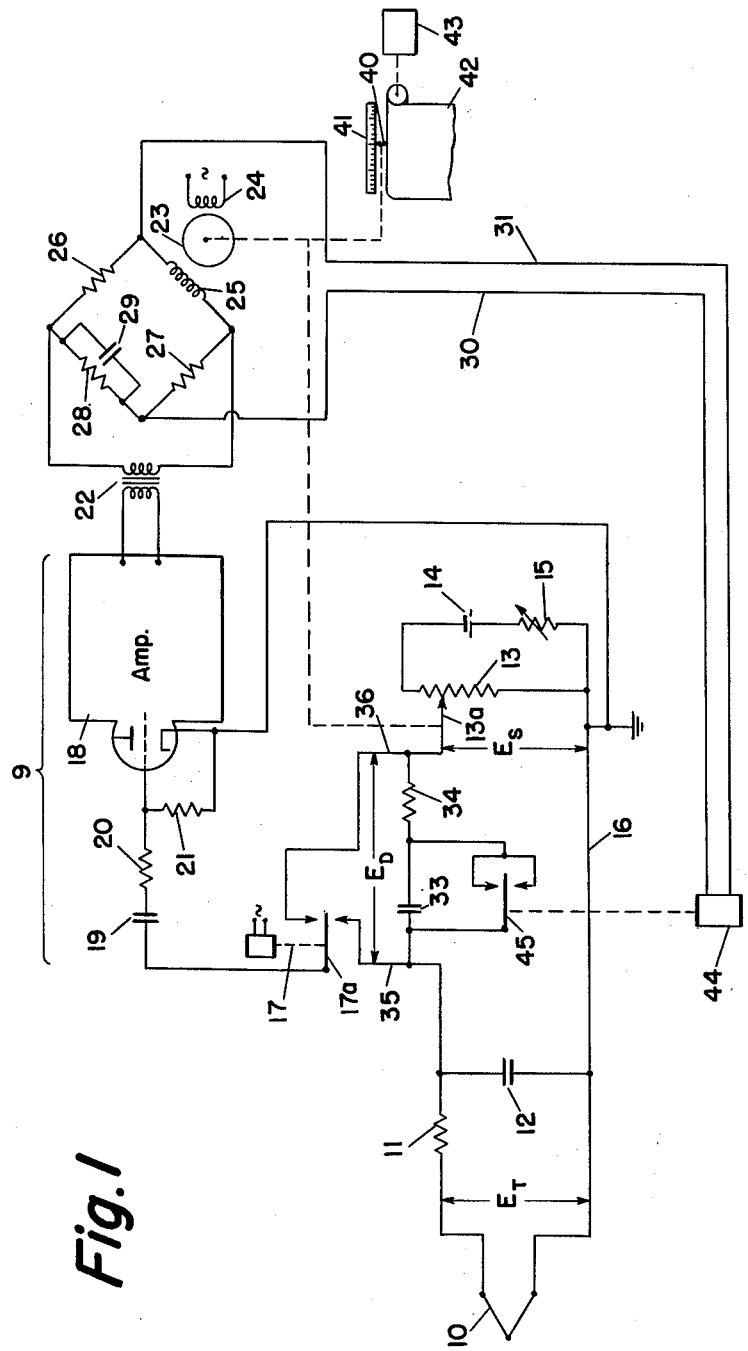
Fig. 1 is a wiring diagram diagrammatically illustrating the invention as applied to a potential-measuring system.

Referring to the drawings, the invention in one form has been shown in Fig. 1 as applied to the measurement of the magnitude of a variable condition whose magnitude may be represented by a varying voltage such, for example, as the measurement of temperature to which the thermocouple 10 is subjected. The voltage of thermocouple 10 is applied to a balanceable network which includes a resistor 11, a capacitor 12, and a slidewire resistor 13 connected to a suitable source of supply, shown as a battery 14, and including in series-circuit therewith an adjustable resistor 15.

The voltage $E_T$ applied to the balanceable network by the thermocouple 10 is opposed in the network by a voltage $E_S$ derived between the adjustable contact 13a of slidewire 13 and the conductor 16. The difference or error-voltage is applied to a detector-amplifier 9 including a vibrator 17 and an amplifier 18. The detector, including the input circuit to the amplifier, is of the high-impedance type, of the order of one megohm, and includes a capacitor 19, a resistor 20 and a grid resistor 21. The vibrator or converter 17 may be of the polarized type operated from any suitable source of alternating current and serves to move its movable contact 17a first against one, and then against the other, of its stationary contacts. The vibrator 17 is preferably of the normally open type. If the polarity of the detector voltage $E_D$ be in one direction, there appears in the output circuit of the amplifier 18 and in the secondary winding of the output transformer 22 an alternating current of phase which with reference to that supplied to a power winding 24 of a motor 23 energizes the motor for rotation in one direction. If the polarity of the detector voltage reverses, the phase of the alternating current supplied to transformer 22 reverses to reverse the rotation of the motor 23.

It will be seen that the secondary winding of transformer 22 is connected to a motor winding 25 by way of a Maxwell bridge of which the motor winding 25 forms one leg. Fixed resistors 26 and 27 form two additional legs, while the fourth leg includes a resistor 28 and a capacitor 29 in shunt therewith. The circuit parameters of the Maxwell bridge are selected for the establishment of bridge balance as between its output conductors 30 and 31 under conditions of application of power from amplifier 18 and with the motor 23 blocked or mechanically held at standstill. For reasons hereinafter set forth, the Maxwell bridge is included as a speed-responsive device since the voltage appearing across its output conductors 30 and 31 is low with the motor at standstill, and increases with rise in speed of the motor.

In accordance with the present invention an error-current integrator, shown as a capacitor 33 connected in series with a resistor 34, is connected across input conductors 35 and 36 of the detector-amplifier for developing and applying a potential difference to the detector-amplifier under certain conditions later to be described in detail.

If it be assumed that the temperature of the thermocouple 10 be gradually rising, the resulting gradual rise of its voltage $E_T$ will, by the resultant error-voltage $E_D$, produce energization of motor 23 for rotation in a direction to produce relative movement between slidewire 13 and its contact 13a in a direction to reduce or maintain the error-voltage at, or approximately at, zero. By reason of the connection of the adjustable part of the slidewire 13, the part developing the potential difference $E_S$, in series-circuit relation with the detector circuit and to the capacitor 12 and to the circuit including resistor 11, the slidewire 13 serves as a tachometer introducing in conjunction with the capacitor 12 into the detector circuit a component of magnitude proportional to the speed of movement of contact 13a, or more specifically, proportional to the rate of change of $E_S$ with respect to time. The component, proportional to velocity, is in the correct direction to produce a virtual balance of the network in advance of its final balanced condition and thus introduces what has come to be known as damping; i. e., adjustment by the motor 23 of voltage $E_S$ by relative positioning of slidewire contact 13a with respect to slidewire 13 to balance voltage $E_T$ and to operate a pen-index 40 relative to scale 41 and chart 42 to a final balanced position without overshoot or undershoot thereof. The chart is driven at constant speed by any suitable means as by a motor 43.

In terms of circuit components, an understanding of the operation of the system as a whole can be set forth mathematically, for example in terms of the error-current, $I_D$. There will be a component of magnitude proportional to $E_T$ multiplied by a proportionality constant and the product divided by the sum of the resistance $R_{11}$ of resistor 11 and of $R_D$, that of the detector-amplifier 9, as for example, the resistance between conductors 35 and 36. Mathematically, this component is equal to $$\frac{(E_T)K}{R_{11}+R_D}$$

The component of error-current due to slidewire position, negative because opposing the current flow from $E_T$, is equal to $$-\frac{E_S}{R_{11}+R_D}$$

The component proportional to velocity is equal to $$-\left(\frac{R_{11}}{R_{11}+R_D}\right)^2 C_{12}\frac{dE_S}{dt}$$

Due to the values of the circuit components used, a term, which includes an integral of the second derivative of $E_S$ with respect to time, may be neglected since by a third time constant its effect is quite small, but 0.05 its original value. The time constant, equal to $$\frac{R_{11}R_D}{R_{11}+R_D}\cdot C_{12}$$

is preferably of the order of 12 to 40 milliseconds. Thus, resistor 11 may have a resistance of 45,000 ohms; capacitor 12, 1.8 microfarads; resistor 34, about 8,000 ohms; and the resistance of the detector $R_D$, 8,000 ohms.

Again assuming the rising temperature of thermocouple 10, but this time with the further assumption that the rise in voltage $E_T$ exceeds the voltage change of $E_S$ with the motor 23 operating at maximum speed, it will be understood at once that the detector voltage, $E_D$, the voltage applied to the conductors 35 and 36 will rise and will continue to rise so long as $E_T$ increases at a greater rate than $E_S$.

In order to eliminate the effect upon the system and particularly upon the integrator 33 of voltages due to the inability of the system to maintain the network substantially in balance, the speed-responsive Maxwell bridge is utilized to apply to the operating coil 44 of a vibrator 45 a voltage of adequate amplitude to move its contacts alternately into and out of engagement with associated stationary contacts. The operation of the vibrator, with its contacts connected across the condenser 33, effectively short-circuits it or prevents flow of current into capacitor 33 and prevents rise of potential across it. When then coil 44 is not energized with alternating current of an amplitude adequate to move the movable contact into engagement with either of the stationary contacts, the appearance of a detector voltage $E_D$ between conductors 35 and 36 produces a current flow through the circuit including resistor 34 and capacitor 33. The flow of current into capacitor 33 produces a rise in potential and thus increases the value of $E_D$ as seen by the detector-amplifier.

The importance of the integrator in increasing the sensitivity of the system will be more fully appreciated by the following discussion.

With the gain of the amplifier 18 set in conventional manner by a gain control to just below a value which will produce hunting, an abrupt change of temperature of thermocouple 10 will, of course, produce high-speed operation of motor 23 to move the contact 13a to a balance point on slidewire 13. The effect is illustrated in Fig. 3.

Figure 3:
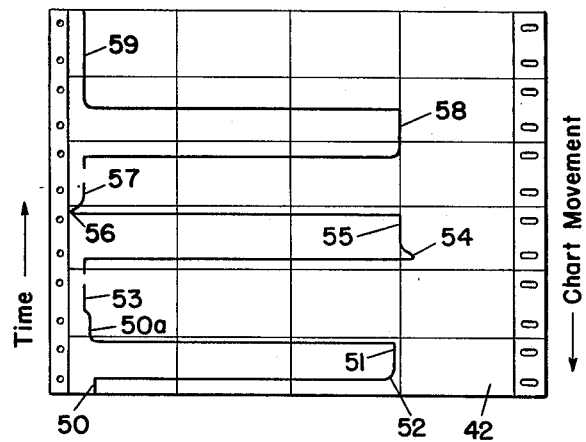
Fig. 3 illustrates the operation of prior art systems and systems in accordance with the present invention in terms of records made upon a record chart.

In Fig. 3 there has been reproduced a part of the record chart 42, and there appears on it a record resulting from the operation of the system as a whole under several different conditions. The first record begins at 50 and indicates that the voltage $E_T$ is at a low value. The record represents the system with the capacitor 33 short-circuited in the input circuit 35, 36. Voltage $E_T$ as above stated is abruptly changed to a higher value with resultant energization of the motor 23 rapidly to move the pen-index 40 upscale of the chart. It will be observed that the pen-index is driven to the balance point, as indicated by the vertical line 51, without hunting and that the deceleration of the motor 23 occurs in a relatively short time as indicated by the small radius of curvature on the record as appearing at 52. The voltage $E_T$ is then reduced to its original value with resultant rapid movement of the pen-index 40 downscale of the chart, reaching the original balance point as indicated by the line 50a.

In order for the motor to be energized there must be applied to the detector-amplifier 9 a voltage $E_D$ of magnitude adequate to produce sufficient torque in motor winding 25 to produce rotation thereof. As balance is attained and the motor 23 comes to standstill there will remain a finite value of $E_D$ which will cause a finite current to flow into capacitor 33. As a result the capacitor 33 will acquire a charge and there will be applied to the input circuit 35, 36 a progressively rising potential difference. Since that potential difference exceeds the value below which the motor 23 will not operate, it will, of course, be energized and produce adjustment of pen-index 40 and slidewire contact 13a. The result of the integration by capacitor 33 of the error-current resulting from the application to it of the detector voltage $E_D$ is graphically shown at 53 in Fig. 3. The movement of the pen-index downscale is by an amount which reduces the foregoing error to a negligibly small value, approximately one-fifth of that existing without the use of the error-current integrator.

Again referring to Fig. 1, if it be assumed that the voltage $E_T$ is rising at a uniform rate (a ramp function), then the voltage $E_S$ will soon be adjusted to change at the same rate and the value of $E_D$ will be reduced toward zero as a limit. However, the voltage across capacitor 12 must change at the same rate as $E_T$ and $E_S$ and since the voltage $E_D$ is reduced to a low value it will be seen that the required charging current for capacitor 12 must largely come from $E_T$ and, hence, that charging current will produce a voltage drop across resistor 11. This loss of potential gives rise to what has come to be known as a "following-error"; that is, a difference or a lag of voltage $E_S$ with respect to $E_T$. It can be expressed in seconds of time.

The following-error can also be expressed in terms of the voltage difference appearing at the left of resistor 11 and contact 13a. A part of that voltage difference represents a drop across resistor 11 and the other the drop due to the impedance $R_D$ of input circuit 35, 36. The provision of the integrator 33 across the input circuit reduces the following-error due to the drop across $R_D$. Thus, there is materially less following-error as a result of the inclusion of the current integrator 33, the capacity of which may be of the order of 72 microfarads.

With capacitor 33 and resistor 34 still in circuit and with a change in voltage $E_D$ to its higher value, it will be observed from Fig. 3 that the pen-index 40 is rapidly moved upscale. However, the pen-index 40 comes to rest only after substantial overshoot as indicated by the protruding end 54 of the record. It is to be noted that when the pen-index is returned to a balance point 55 it is displaced upscale from balance point 51. Thus, there is achieved greater precision in measurement but with overshoot in the balancing operation. When voltage $E_T$ is again reduced to its lower value, and the pen-index 40 moves downscale, there is overshoot as indicated by the projecting end of the record 56, with return of the pen-index to the balance point as indicated by the line 57 which indicates balance in the same position as line 53 and substantially without error.

In accordance with the present invention, the advantages of the employment of the error-current integrator have been retained, and the disadvantage of the resulting overshoot has been eliminated by employing the speed-responsive device for effectively removing the integrator from the input circuit during the time when the motor 23 is operating at high speed. It does not appear that there is anything critical about the time the integrator should be rendered ineffective in terms of motor speed so long as it operates before the motor speed nears its top limit.

In one modification of the invention, the Maxwell bridge was adjusted to produce an output voltage due to the rising counter-electromotive force of motor 23 from about 1.6 volts with the motor stalled, to about 5 volts with the motor running at light-load under conditions of about 2% of scale unbalance corresponding to full speed operation. The vibrator had its stationary contacts normally spaced from the movable contact by amount such that contact was made upon application to the coil 44 of a voltage of approximately 3 volts, corresponding with about two-thirds maximum motor speed. The vibrator 44 can be energized effectively to remove the capacitor 33 from the input circuit with the motor speed at any desired fraction of maximum speed and effectively to place the capacitor 33 across the input circuit when the motor speed is reduced to any desired lesser fraction, say about one-third of its maximum.

With the speed-responsive switch 45 effective, and again with a change of voltage $E_T$ to its higher value, Fig. 3, it will be seen that the pen-index 40 is driven upscale and comes into a new position of balance as indicated at 57 without overshoot and without appreciable error. Upon reduction of the voltage $E_T$ to its lower value, the pen-index is driven downscale to a new position of balance as indicated at 59, again without overshoot and without appreciable error.

A further result of integrating the error-voltage or signal during the time that it is of a low order is to produce the same kind of operation of the system as though the amplification were increased five times. By including the speed-responsive device effectively to remove the integrator during periods when $E_s$ is rapidly changing, there is avoided overshoot in the adjustment of contact 13a and, of course, in the movement of pen-index 40. When the detector signal $E_D$ is large it means that the difference between voltage $E_T$ and voltage $E_s$ is correspondingly large and that can only occur when $E_s$ is changing at high rate but not rapidly enough to keep up with $E_T$. Thus, a substantial potential difference $E_D$ occurs when contact 13a is not adjusted by motor 23 at the same rate at which the change in voltage $E_T$ occurs. Such a condition can arise if voltage $E_T$ changes as a step function, and it can also arise when motor 23 is operating at its maximum speed for a time interval prior to attainment of balance. If voltage $E_T$ is changed by an amount which requires a time interval for $E_s$ to approach it in magnitude, the value of $E_D$ will become fairly large. During periods of the aforesaid character a large value of $E_D$ would produce operation of the integrator, if switch 45 were not provided, as by accumulation of a charge on capacitor 33 which is not related to the remanent signal during the attainment of balance, and it is this accumulation of a charge on capacitor 33 which gives rise to the overshoot as indicated at 54 and 55 of Fig. 3. However, by providing the switch 45 operable in response to rate of change of $E_s$, the overshoot is eliminated and the sensitivity is increased. In general, capacitor 33 should be large as compared with capacitor 12.

While the invention has been illustrated and described in terms of measurement of a varying potential voltage $E_T$, in Fig. 1, it is equally applicable to the measurement of an unknown current $I_x$ which, as shown in Fig. 2, may be produced by any suitable means 10a, such for example, as from a photocell including those of the barrier-layer and photomultiplier types.

In Fig. 2, in which corresponding parts have been given the same reference characters as in Fig. 1, it will be observed that resistor 11a is connected across or in shunt with the current source 10a and that the speed-responsive device now comprises a switch 45a operated by a centrifugal device of the fly-ball type driven from a shaft 61 through a mechanical connection 62 from motor 23. The centrifugally operated switch 45a is adjusted to be closed when the motor speed approaches about two-thirds its maximum or speed-limited value and to open when the speed decreases to about one-third its maximum value. Damping is provided in Fig. 2 by capacitor 12 and resistor 11a by the introduction of a component proportional to the rate of change of the potential difference $E_s$ derived from the slidewire. Thus, it will be seen that the capacitor 12 is effectively connected in series with the input circuit 35, 36 of the detector-amplifier 9 and that portion of slidewire 13 from which $E_s$ is taken.

In a typical embodiment of the invention the resistor 11a had a resistance of 24,000 ohms; the capacitor 12 was 2 microfarads; the capacitor 33, 150 microfarads; resistor 34 8,000 ohms; slidewire 13, 5,000 ohms; with the impedance of the input circuit of amplifier 18 of the order of 100,000 ohms.

In Fig. 2 the functions of the integrator 33 and of the speed-responsive switch 45a are the same as in Fig. 1, and they produce improved records of the same kind as illustrated in Fig. 3. The importance of minimizing error is well understood by those skilled in the art, particularly when the measuring problem requires highest accuracy. In this connection it is to be observed that error will be minimized, in accordance with the present invention, whenever the integrator is in operation and not solely at the time balance is attained. This means that when the magnitude of the condition under measurement is slowly changing (a condition during which its magnitude can be closely and accurately controlled) it can be measured with greatest precision. When the condition is changing at high rate, the maximum in precision of measurement is not required.

Figure 4:
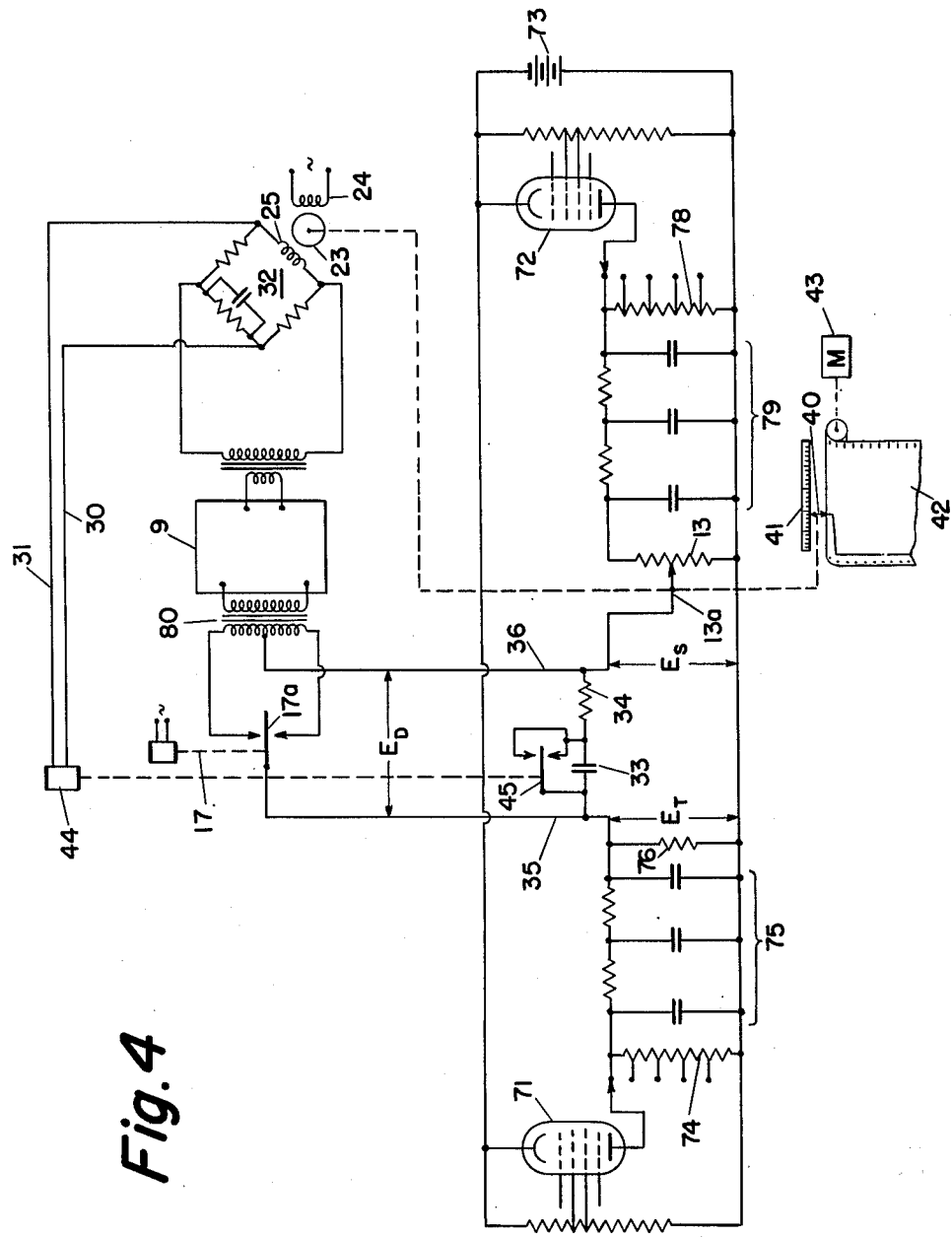
Fig. 4 is a wiring diagram of the same general type as Fig. 2 but is applied to the measurement of the ratio between two currents.

The foregoing advantages can be readily appreciated with the invention applied to systems such as shown in my Patent No. 2,522,976. Such a system, as herein shown in Fig. 4, is particularly useful for accurate measurement of the ratio between two currents, both of which may range below about 20 microamperes and which may be developed, for example, as from photomultiplier tubes 71 and 72. The photocells 71 and 72 may form a part of a spectrographic analyzer or photometer, and variation in current from each of such cells may be due to the difference in the intensities of different lines of the spectrum. For example, current flowing from a source 73 through photomultiplier tube 71 and resistor 74 will have a value dependent upon the intensity of a spectral line directed upon that cell. The potential difference developed across resistor 74 is applied to a filtering network 75 having an output resistor 76. Current flowing from source 73 through cell 72 and a resistor 78 will have a value dependent upon the intensity of a spectral line directed upon that cell. It will be assumed that an unknown spectral line is directed to cell 71 and that there is directed to cell 72 a known spectral line, one having a known intensity. The potential difference developed across the resistor 78 is applied to a filtering network 79 which is terminated in a variable resistor or slidewire 13. Accordingly, the position to which the movable contact 13a is moved by balancing motor 23 will be in proportion to the ratio of the relative magnitudes of the intensities of the selected spectral lines in terms of the respective currents produced by the photomultiplier cells 71 and 72.

In view of the above discussion of Fig. 2 it can be seen in Fig. 4 that the capacitors in the filtering network 75 provide a damping action in the control of motor 23. In Fig. 4 the detector-amplifier 9 includes a high impedance transformer 80 having the ends of its primary winding connected to the stationary contacts of a vibrator 17, while a midtap thereof is connected to conductor 36 forming one side of the input circuit, the other side including conductor 35 leading to the movable contact 17a of vibrator 17. The Maxwell bridge 32 is used as the speed-responsive means for energizing coil 44 for actuating the vibrator 45 in response to change in speed of motor 23. The vibrator 45 may be of the type disclosed in U. S. Patent No. 2,614,188, dated October 14, 1952, and filed January 31, 1947, by me and co-inventor, Raymond E. Tarpley, or of any other suitable type such as the vibrator disclosed in Side Patent No. 2,423,524. Such a vibrator should be of the normally open contact type with the stationary contacts suitably spaced from the movable contact.

With flow of a standard current resulting from the application to cell 72 of one or more spectral lines of known intensity, the detector signal $E_D$ applied to the input circuit 35, 36 produces operation to adjust contact 13a until potential $E_S$ is equal and opposite potential $E_T$ developed across resistor 76. Since the intensities of known or reference energy will be different with change in specimens, the standard current may in successive measurements vary through a wide range, such for example as five to one. Nevertheless, though under one condition, the current flowing through slidewire 13 may be but a fifth of what it is under other conditions, the system functions effectively and rapidly to establish the ratio measurement without undershoot or overshoot and with negligible error due to the operation of the integrator comprising the capacitor 33 and its associated speed-responsive switch or vibrator 45.

It is to be understood that other forms of speed-responsive devices may be utilized in addition to the speed-responsive bridge and the centrifugally operated switch. For example, as shown in Fig. 5, the motor 23 may be arranged to drive a conductive disc 90 between, or in close proximity to, permanent magnets 91 and 92 held in proximity therewith by supporting members 93 and 94, the latter being clamped by a bolt 95 in an assembly intermediate contact arms 96 and 97. When the disc 90 is rotated in a clockwise direction, a drag force is developed by eddy currents in conductive disc 90 upon the assembly including magnets 91 and 92 tending to move flexible element 94 to the right. Contact-supporting member 96 is resilient and opposes the drag movement. However, when the speed rises to, say, about two-thirds its maximum, the arm 96 is moved sufficiently to complete a circuit between conductors 33a and 33b which are connected to opposite sides of the capacitor 33 in any of the preceding modifications of the invention. Similarly, when the motor speed rotates disc 90 in a counterclockwise direction, the contact member 97 will be moved to complete a circuit between conductors 33a and 33b effectively to remove the capacitor 33 from the input circuit 35, 36. The stationary contacts 98 and 99 may be threaded into stationary supporting arms 100 and 101, and thus be readily adjustable with reference to their associated movable contacts. Thus, the drag-switch assembly of Fig. 5 performs the same functions as the earlier described arrangements in rendering the integrator ineffective during periods of high-speed operation of motor 23 and rendering it effective during low-speed operation of that motor.

Figure 6:
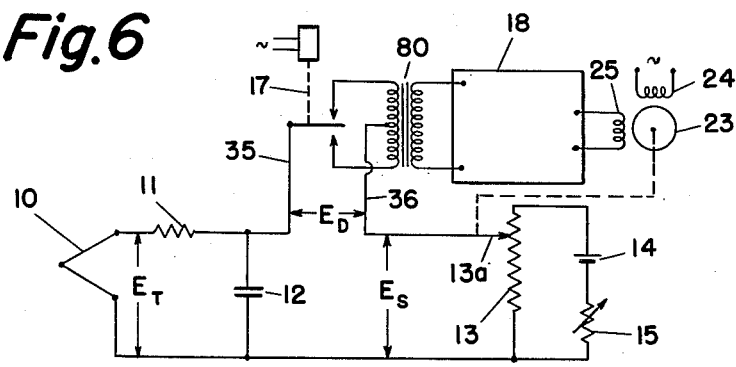

With further reference to the following-error, and now particularly to Fig. 6, it will be remembered that if the voltage $E_T$ be changing at a constant rate (a ramp function), then the voltage $E_S$ will be adjusted to change at the same rate and that the difference between $E_T$ and $E_S$ will represent the magnitude of the error-voltage. The lag of $E_S$ with respect to $E_T$ represents the following-error. In Fig. 6, that following-error is of a substantial order (even though it may not greatly exceed the width of a line drawn by the pen 40 of the recorder) and is at least in part due to the fact that the voltage across capacitor 12 must rise under the assumed conditions at the same rate as the voltages $E_T$ and $E_S$. In order for that condition to be met, there must be maintained current flow into (or out of, during a falling temperature) the capacitor 12, and there must be maintained a voltage difference producing such flow of current. With $E_D$ small that current is largely due to $E_T$ and produces the undesired drop across resistor 11. Thus, $E_S$ lags $E_T$.

Figure 7:
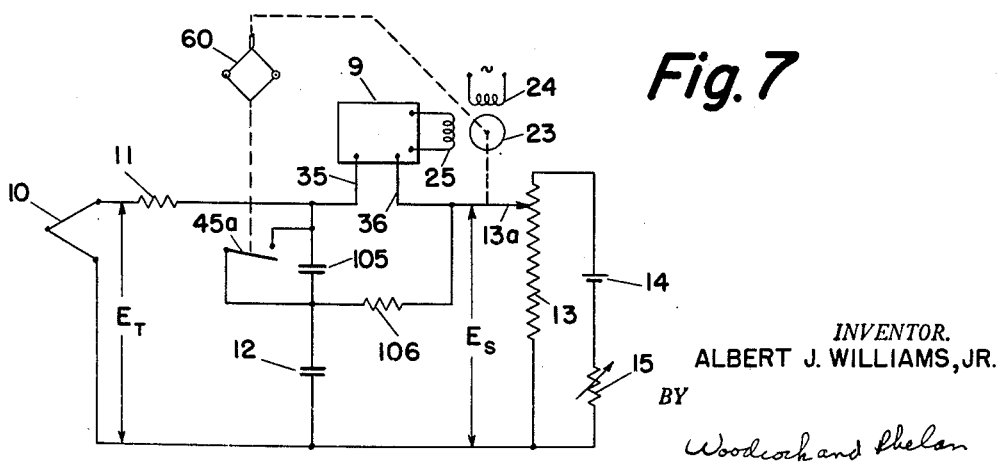

In order to avoid the following-error the modification of Fig. 7 may be employed. The damping condenser 12 remains effectively in series with the detector-amplifier 9 and the slidewire 13. (This connection can be readily confirmed by assuming the speed-operated switch 45a is in the closed position.) By connecting the capacitor 12 through a resistor 106 to the movable contact 13a of slidewire 13, it will be seen that when the rate of change of $E_S$ is equal to the rate of change of $E_T$, then the rate of change of the voltage $E_{12}$ across capacitor 12 will be at the same rate and that current will flow through resistor 106 into capacitor 12 (or out of the same) to establish the equality between the two rates.

In the foregoing manner there has been removed from the input circuit 35, 36 the flow of the required current through resistor 11 to capacitor 12 which, as presviously explained, was responsible for the following-error. Thus in Fig. 7, the following-error has been entirely eliminated. However, there has been retained in Fig. 7 the capacitor 105 which, it will be observed, is connected through resistor 106 across the input circuit 35, 36 and functions as an error-current integrator. By provision of the switch 45a operated in response to the speed of motor 23 as by the centrifugal device 60, the capacitor 105 is made effective during the time the speed of operation of the motor 23 is low, and during that period the integrator continues to function effectively to increase the sensitivity of the system as a whole and by as much as five times. It is to be further observed that the connection of capacitor 12 to line 35 either by way of capacitor 105 or by way of the speed-responsive switch 45a is essential to the proper damping function performed by capacitor 12.

Figure 8:
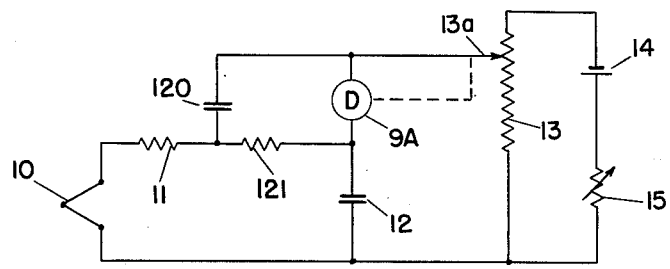

Referring now to the system of Fig. 8, it will be seen that in many respects it is similar to Fig. 1. However, in Fig. 8 there have been added a capacitor 120 and a resistor 121. The detector, the amplifier and the motor of Fig. 1 have been illustrated as a symbol labeled 9A and including the letter D for "detector." The broken line leading from 9A to the movable contact 13a of slidewire 13 indicates its adjustment by the detector-amplifier-motor 9A. If the resistance of the detector 9A be assumed to be $R_D$, and that $R_D$ is less than the sum of the resistances of resistors 11 and 121, then the addition of the capacitor 120 and of the resistor 121 will be effective to introduce into the operation of the system a velocity component which will increase the speed of the balancing operation. While the previously described systems are high-speed balancing systems and are fast enough to drive the pen-index 40 from one side of the chart to the other in approximately one second, by the addition of the capacitor 120 of 1 microfarad and a resistor 121 of, say, 2,000 ohms with resistor 11 the same value, and capacitor 12, 3 microfarads, and $R_D$ 1500 ohms, the same system will produce full-scale movement of the pen-index 40 in less than a second, for example, within about three-fourths of a second, and without undershoot or overshoot in attainment of balance.

In the system of Fig. 8, advantage is taken of two components of velocity; one resulting from capacitor 12 which is in one direction, and the other of which from capacitor 120 is in the opposite direction. By controlling their relative magnitude the effect of an acceleration component is introduced by which is achieved a decreased time required to bring the system into balance.

It will be recalled that the velocity component introduced by the capacitor 12 was in a direction to produce a virtual balance in advance of the movement of contact 13a to its final position. The capacitor 120 instead of being connected in series with detector 9A, as is capacitor 12, is in fact connected in parallel with the detector and, hence, introduces a velocity component of sign opposite to that introduced by capacitor 12.

A mathematical consideration of the circuit of Fig. 8 will show that if the circuit constants of the respective circuits involving capacitor 120 and capacitor 12 are suitably adjusted, the velocity component introduced by capacitor 12 can be balanced (on occurrence of a ramp function) by the velocity component introduced by the capacitor 120. The same type of analysis will show that by making the time constant of the circuit including the capacitor 120 larger than the time constant of the circuit including the capacitor 12, there is introduced into the operation of the system an effect which takes into account the acceleration and deceleration of the motor driving contact 13a.

Figure 8A:
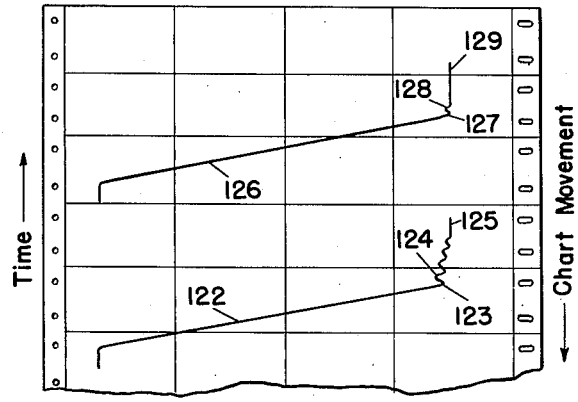

If a velocity component such as introduced by capacitor 12 were alone used, then as shown by the record 122 of Fig. 8A, the pen is moved upscale toward its final position. Virtual balance is attained in the region ahead of that indicated at 123. The deceleration required to bring the pen to rest at the virtual balance point is produced by reverse energization of the motor, a "plugging" operation, and the reversed energization of the motor does not disappear at the same instant at 123, that the pen-index 40 comes to standstill, but instead causes a movement of the pen to the region indicated at 124 and as shown, several torque reversals on the motor occur before attainment of the final balance as indicated at 125.

By introducing a velocity component of lesser magnitude and of reverse sign with respect to that introduced by capacitor 12, an effect is achieved which takes into account the deceleration of the motor and of the pen-index, and as virtual balance is attained for the record 126 at a time ahead of the region indicated at 127, the reversed energization of the motor at the time the pen-index comes to a standstill at 127, produces a much smaller movement, and the pen movement in the reverse direction occurs but a single time as indicated at 128, the final balance point then being attained as indicated at 129.

The relative saving in time is considerable considering that the total time of balance is reduced from one second to approximately three-fourths of a second. It is to be understood that the velocity component introduced by capacitor 12 is effective and is not substantially balanced by the reverse component introduced by capacitor 120 though the exact relative magnitudes between the two will be selected in accordance with the mass of the moving parts of the balancing system as a whole as well understood by those skilled in the art. In other words, the product of $C_{12}(R_{11}+R_{121})^2$ is made greater than the product of $C_{120}(R_{121}+R_D)R_{11}$. A further requirement is that the time constant for the capacitor 12 with its associated discharge paths shall be small relative to the time-advance or damping action which it contributes in transmitting a ramp voltage from the slidewire 13 to the detector. In practice, suitable parameters may be selected as follows:

$C_{12}$=8 mfds.
$C_{120}$=8 mfds.
$R_{11}$=4,000 ohms
$R_{121}$=4,000 ohms
$R_D$=2,000 ohms and other values, of course, may be used in accordance with the requirements set forth above. Though the circuit may be made much more complicated than shown in Fig. 8, as for example by the addition of filtering networks, nevertheless, there will remain the equivalent of resistors 11 and 121 which are then to be referred to in the determination of whether their sum is made greater than the resistance of detector 9A.

Figure 9:
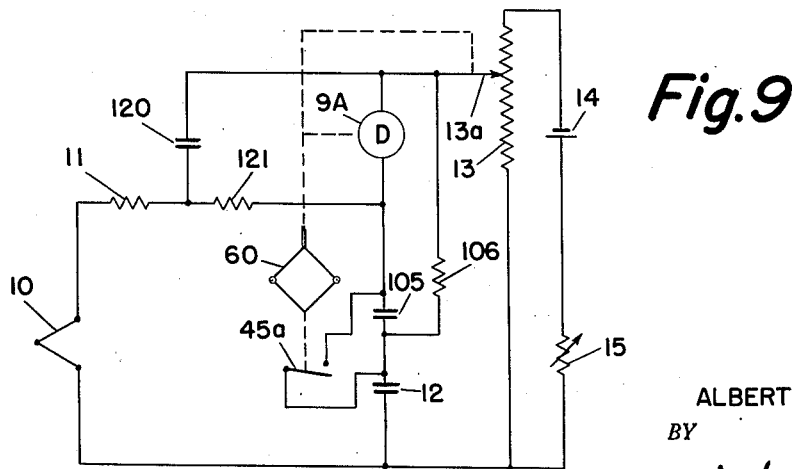

In order to eliminate the following-error present in the system of Fig. 8, additions may be made as shown in Fig. 9, namely, the additional capacitor 105 and resistor 106 previously described in connection with the operation of Fig. 7. The system of Fig. 9 functions in accordance with the explanation given above for Fig. 7 and Fig. 8 and it need not be again repeated.

Figure 10:
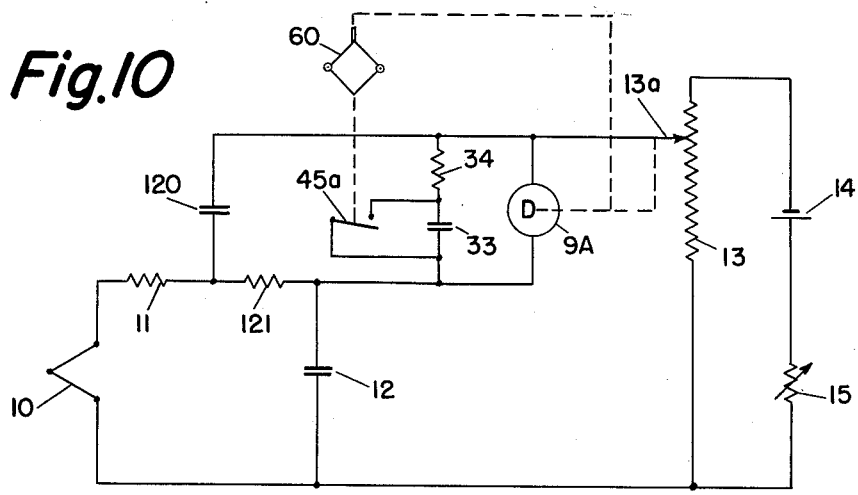

Referring now to Fig. 10, in the event that high-speed operation is desired with increased sensitivity of the system during final balancing, then there may be combined with the system of Fig. 8 the features of Fig. 1, namely, the addition of the resistor 34 and the integrating capacitor 33 across the detector 9A. The system functions as fully explained in connection with Fig. 1 and Fig. 8.

Figure 11:
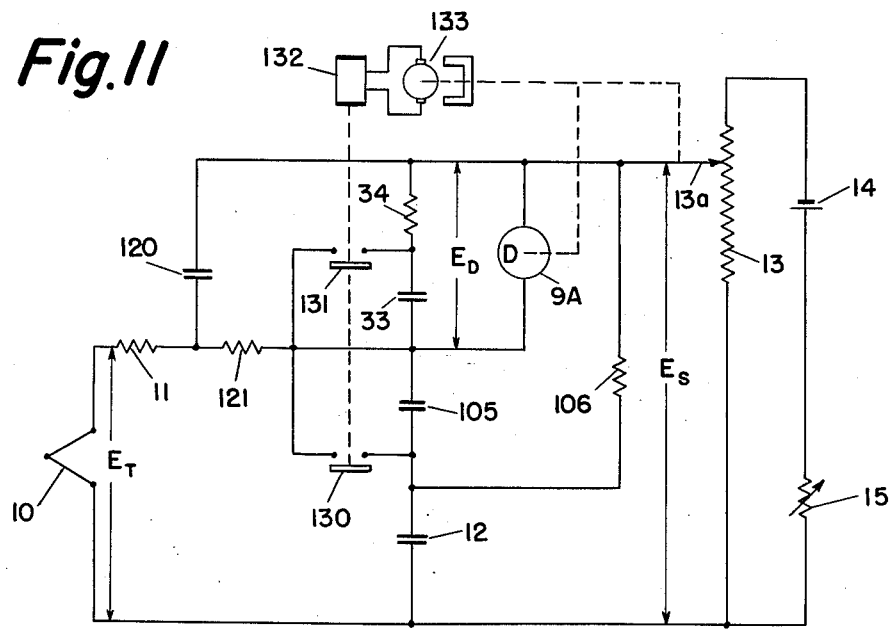

In Fig. 11 I have included the several advantageous features of the above-described circuits. The capacitor 12 introduces the velocity component in accordance with movement of the contact 13a of slidewire 13. The connection of resistor 106 and the addition of capacitor 105 eliminates following-error. Capacitor 120, together with resistor 121, introduces the effect of an acceleration component which increases the speed of operation of the system in attainment of balance. Capacitor 33, as previously described, forms an integrator and is connected in series with resistor 34 across the detector 9A. In response to the rate of change in the position of contact 13a or of the voltage $E_s$ the capacitors 33 and 105 are removed from circuit or made ineffective.

As shown in Fig. 11, contacts 130 and 131 are moved to closed positions by a relay 132 energized from an electric tachometer 133 driven from the motor shaft as in accordance with the speed of movement of contact 13a. When the speed rises to a selected value, the relay coil 132 is effective to close the contacts, and when the speed decreases to a predetermined value, the contacts are opened to make capacitors 33 and 105 effective to perform their previously described functions.

While the system of Fig. 11 combines the many features set forth in the earlier description, it is to be understood that a number of such features may be used without inclusion of others, that being a part of the purpose of the development of the description besides simplifying it and making it more understandable.

With the above principles of the invention in mind, it will, of course, be understood that those skilled in the art may now make further modifications and add additional features to the circuits, such as filtering circuits and the like, without departing from the invention as set forth in the appended claims.

What is claimed is:

1. A measuring system comprising an electrically balanceable network having a circuit element unbalancing said network with change in the magnitude of a condition under measurement, an adjustable circuit element for restoring balance of said network, a detector responsive to an error-voltage of magnitude related to the unbalance of said network, means operable under the control of said detector for adjusting said adjustable circuit element in a direction to restore balance of said network and at a speed which increases with increasing unbalance of said network, a circuit connected across said detector including an error-current integrator for applying an integrated potential difference to said detector, and circuit-controlling means operable when said speed rises above a predetermined value for removing from said detector said integrated potential difference and for applying said integrated potential difference to said detector when said speed decreases to a predetermined value.

2. A measuring system comprising an electrically balanceable network having a circuit element unbalancing said network with change in the magnitude of a condition under measurement, an adjustable circuit element for restoring balance of said network, a detector responsive to an error-voltage of magnitude related to the unbalance of said network, means operable under the control of said detector for adjusting said adjustable circuit element in a direction to restore balance of said network with a rate of change of magnitude related to the degree of network unbalance, a circuit connected across said detector including an error-current integrator for applying an integrated potential difference to said detector, and means operable when said rate of change of magnitude is above a predetermined value for removing said integrated potential difference from said detector and for applying said integrated potential difference to said detector when said rate of change decreases to a predetermined value.

3. A measuring system comprising an electrically balanceable network having a circuit element unbalancing said network with change in the magnitude of a condition under measurement, an adjustable circuit element for restoring balance of said network, a detector responsive to an error-voltage of magnitude related to the unbalance of said network, driving means operable under the control of said detector for adjusting said adjustable circuit element in a direction to restore balance of said network and at a speed related to the magnitude of said error-voltage, said driving means having a maximum speed of operation, a circuit connected across said detector including an error-current integrator for applying an integrated potential difference to said detector, and speed-responsive means operable prior to attainment of said maximum speed for removing from said detector said integrated potential difference and for applying said integrated potential difference to said detector when said speed decreases below said maximum.

4. A measuring system comprising an electrically balanceable network having a circuit element unbalancing said network with change in the magnitude of a condition under measurement, an adjustable circuit element for introducing an electrical change in said network in the opposite direction from that introduced by said first element for restoring balance of said network, a detector responsive to an error-voltage of magnitude related to the unbalance of said network, means operable under the control of said detector for adjusting said adjustable circuit element in a direction to restore balance of said network and at a speed which increases with increasing unbalance of said network, a capacitor included in series-circuit relation with said detector and said adjustale element for introducing a component of control related to the speed of adjustment of said circuit element, an electrical circuit connected across said detector and including an error-current integrator for applying an integrated potential difference to said detector and comprising across said detector a capacitor and a resistor in series with said capacitor, and circuit-controlling means operable when the speed of adjustment of said adjusting means rises above a predetermined value for effectively removing said capacitor from said electrical circuit and for restoring said capacitor in operation in said circuit when said speed decreases to a predetermined value.

5. The combination set forth in claim 4 in which said detector has connected in shunt with said integrating capacitor and resistor an additional capacitor, a resistor being included in series between said additional capacitor and said detector for introducing a component to increase the speed of operation of the system in attaining balance.

6. The combination set forth in claim 4 in which the capacitor in series-circuit relation with the detector and said adjustable means introduces a component of velocity which produces a virtual balance in advance of actual balance of the network, a capacitor connected in parallel with said detector and including in circuit therewith a resistor between it and said detector for introducing a velocity component of sign opposite and of lesser magnitude than that introduced by said series-connected capacitor to increase the speed of operation of the system in attaining balance.

7. The combination set forth in claim 6 in which there are included circuits respectively extending one from said adjustable element and including a resistor to said series-connected capacitor and the other from said detector to said series-connected capacitor and including an additional capacitor for eliminating the following-error.

8. A measuring system comprising an electrically balanceable network having a circuit element unbalancing said network with change in the magnitude of the condition under measurement, an adjustable circuit element for restoring balance of said network, a detector responsive to an error-voltage of magnitude related to the unbalance of said network, driving means operable under the control of said detector for adjusting said adjustable circuit element in a direction to restore balance of said network and at a speed which increases with increasing unbalance of said network, a first capacitor included in series-circuit relation with said adjustable element and said detector for introducing a damping component into the operation of said driving means, means for increasing the speed of response of the system comprising a second capacitor connected across said detector in series-circuit relation with a resistor between it and said detector, the effect of said second capacitor across said detector being small compared with that of said first capacitor which introduces said damping component, and means operable when said speed exceeds a predetermined value for effectively removing said second capacitor from its series-circuit connection.

9. The combination set forth in claim 8 in which there is additionally connected across said detector a resistor and a third capacitor connected in series therewith, said means operable when said speed exceeds a predetermined value also effectively removing said third capacitor from its series-circuit connection.

10. The combination set forth in claim 9 in which there is connected across said detector a resistor and a fourth capacitor connected in series with each other.

11. A potential measuring system comprising an electrically balanceable network having a circuit element developing a potential difference in said network with change in the magnitude of a condition under measurement, said network having a series-circuit at least including said element, first and second resistors and a first capacitor, said network including an adjustable resistor for developing in said network a potential difference opposing that introduced by said first-named element, a detector responsive to an error-voltage of magnitude related to the unbalance of said network, said detector being connected in a series circuit including said adjustable resistor and said capacitor, said detector also being included in a series-circuit including said adjustable resistor, said first and second resistors and said first-named element, a second capacitor connected between the juncture of said first and second resistors and the opposite side of said detector, said detector having a predetermined resistance, said first and second resistors having a total resistance materially greater than that of said detector for introducing the effect of an acceleration component to increase the speed of response of said system, driving means operable under the control of said detector for adjusting said resistor in a direction to maintain said network in balance, a resistor and a third capacitor of a size which is large compared with said first-named capacitor connected in series with each other and across said detector, and speed-responsive means for removing said third capacitor from its series-circuit connection when the speed of adjustment of said adjustable resistor is high and for reintroducing it into its series-circuit connection when that speed is low.

12. A potential measuring system comprising an electrically balanceable network having a circuit element developing a potential difference in said network with change in the magnitude of a condition under measurement, said network having a series-circuit at least including said element, first and second resistors and a first capacitor, said network including an adjustable resistor for developing in said network a potential difference opposing that introduced by said first-named element, a detector responsive to an error-voltage of magnitude related to the unbalance of said network, said detector being connected in a series-circuit including said adjustable resistor and said capacitor, said detector also being included in a series-circuit including said adjustable resistor, said first and second resistors and said first-named element, a second capacitor connected between the juncture of said first and second resistors and the opposite side of said detector, said detector having a predetermined resistance, said first and second resistors having a total resistance materially greater than that of said detector for introducing the effect of an acceleration component to increase the speed of response of said system, driving means operable under the control of said detector for adjusting said resistor in a direction to maintain said network in balance, a third capacitor, said third capacitor and said first capacitor being connected in series-circuit relation with said detector and said adjustable resistor, a resistor connected to the juncture of said capacitors and to said adjustable resistor, a resistor and a fourth capacitor connected in shunt with said detector, and speed-responsive means for removing from its shunt connection said fourth capacitor and for also removing from its circuit connection said third capacitor when the speed of operation of said adjustable resistor is high and for reinserting said capacitor when that speed is low.

ALBERT J. WILLIAMS, Jr.

References Cited in the file of this patent

UNITED STATES PATENTS

| Number | Name | Date |
|---|---|---|
| 2,282,726 | Jones | May 12, 1942 |
| 2,439,096 | Pattee | Apr. 6, 1948 |
| 2,456,765 | Borell | Dec. 21, 1948 |